Patented Jan. 2, 1923.

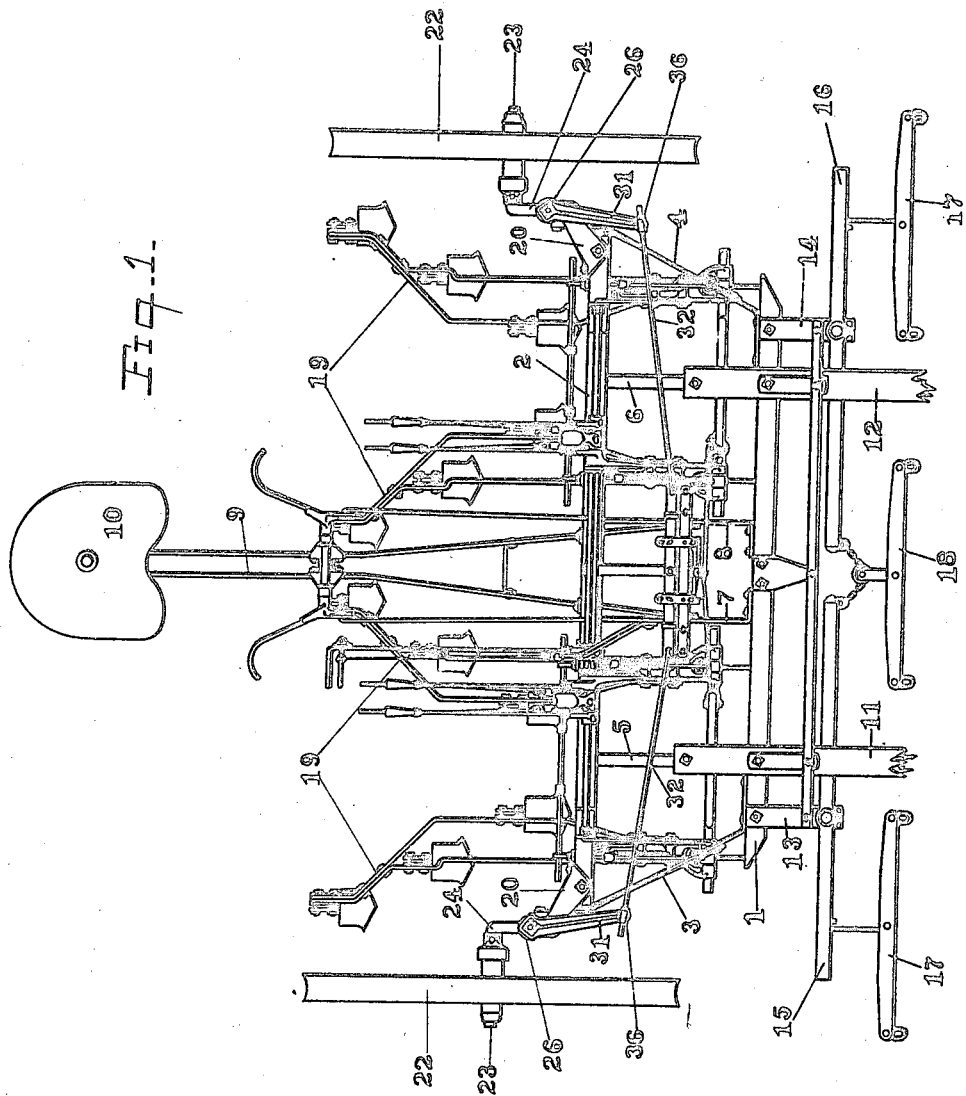

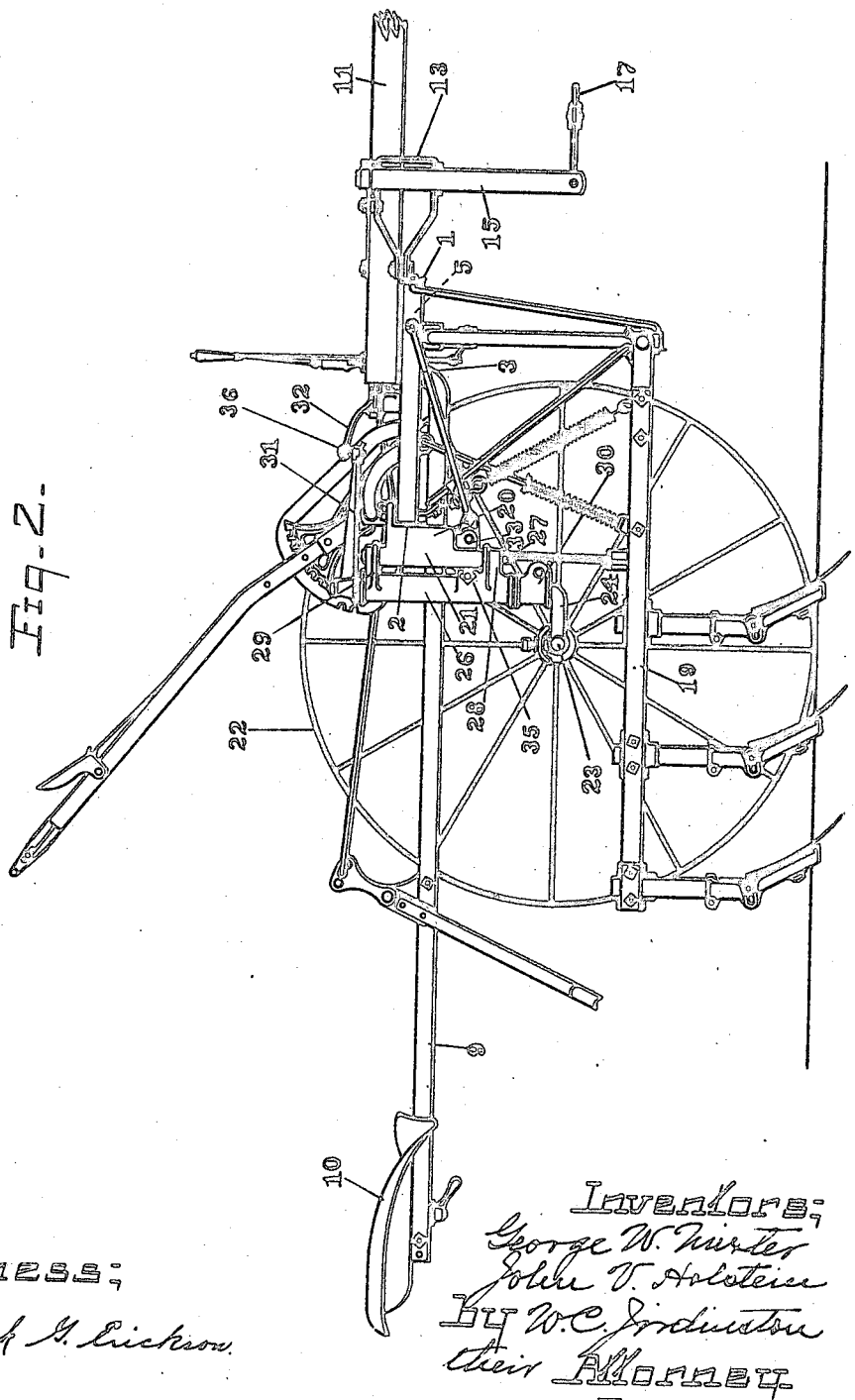

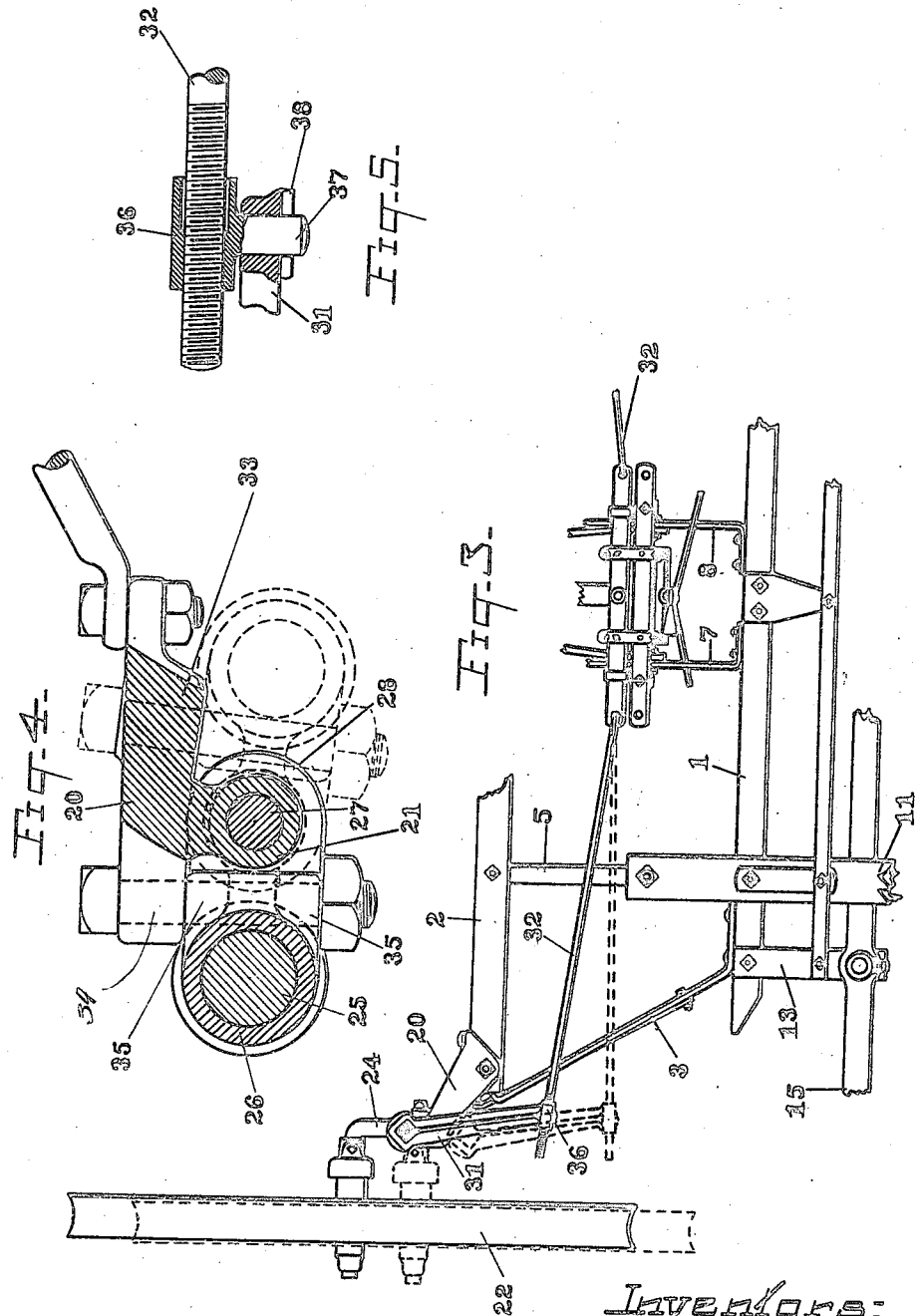

1,440,405

UNITED STATES PATENT OFFICE.

GEORGE W. MIXTER AND JOHN V. HOLSTEIN, OF MOLINE, ILLINOIS, ASSIGNOR TO DEERE AND COMPANY, OF MOLINE, ILLINOIS, A CORPORATION OF ILLINOIS.

CULTIVATOR.

Application filed October 3, 1916, Serial No. 123,497. Renewed January 3, 1922. Serial No. 526,809.

*To all whom it may concern:*

Be it known that we, GEORGE W. MIXTER and JOHN V. HOLSTEIN, respectively, citizens of the United States, residing at Moline, in the county of Rock Island and State of Illinois, have invented certain new and useful Improvements in Cultivators, of which the following is a specification, reference being had therein to the accompanying drawing.

Our invention relates to cultivators and more particularly to the wheel mounting thereof.

The object of our invention is to provide a simple and effective means for shifting the wheels and axles to compensate, not only for variation in the weight of the draft attachment which is changed according to the number of horses utilized to draw the cultivator, but likewise for variation in the weight of operators, so that down pressure upon the necks of the horses is practically eliminated.

Referring to the drawings in which similar numerals indicate identical parts—

Figure 1 is a plan view of a two row cultivator embodying our invention.

Figure 2 is a side elevation of Figure 1 with the rear wheel removed.

Figure 3 is an enlarged plan view of one end of the machine showing in dotted lines position of the parts embodying our invention, after adjustment, and Figures 4 and 5 are enlarged details in part section.

In the drawings we have shown a two row cultivator, but do not limit ourselves to such for our invention is applicable to other types of cultivators. The main frame consists of a front bar 1 and a rear bar 2 spaced apart and rigidly connected by side bars 3 and 4, and bars 5, 6, 7 and 8. A seat support 9 is secured to the bars 7 and 8 and to the rear frame bar 2 and has a seat 10 mounted thereon. Draft poles 11 and 12 are secured to the bars 5 and 6 and to the frame bar 1. Projecting forwardly from the frame bar 1, and secured thereto, are brackets 13 and 14 on which are pivotally mounted doubletrees 15 and 16, carrying singletrees 17 on their outer ends, and to their inner ends is connected a singletree 18. Gangs of cultivating devices 19 are carried by suitable supports connected to the frame.

Rigidly secured on the bar 2 near the ends thereof are brackets 20 having vertical sleeves 21; the wheels 22 are mounted on laterally extending end portions 23 of rearwardly projecting parts 24 of axles having vertical spindles 25. The spindles 25 are journaled in bearings 26 parallel with the sleeves 21 and are rotatably supported thereon by pins 27 which extend through arms 28 and 29 on the bearings 26 and through the sleeves 21; the arms 29 extending over the tops of the sleeves 21, and the arms 28 extending beneath the lower end thereof. Collars 30 on the spindles 25 are interposed between the bases of the bearings 26 and the rearwardly projecting parts 24 of the axle.

On the upper ends of the spindles 25 are rigidly mounted arms 31 projecting forwardly and connected by rods 32 to a suitable mechanism for angling the wheels. On the front of the sleeves 21 are lugs 33 and on the rear thereof are similar lugs 34. On the bearings 26 are lugs 35 registering with either of the lugs 33 and 34 and securable thereto in a manner and for a purpose hereafter described.

As shown in the drawings the cultivator is equipped with a draft device for three horses and the bearings 26 are rearward of the bracket sleeves 21 and secured in place by suitable bolts passed through perforations in the lugs 34 and 35. When a four horse draft device is substituted for the three horse shown, or a heavier driver is to operate the machine the additional weight will cause pressure upon the necks of the horses; to compensate for this increased weight we shift the axles forwardly so that the weight of the entire mechanism is brought closer to the axis of the wheels. In shifting the axles and wheels we remove the bolts in the lugs 34 and 35 then swing the bearings 26, which are pivotally supported on the brackets 20 by the pins 27 passing through the arms 28 and 29 and the sleeve 21; the bearings are swung laterally until the lugs 35 thereon are in contact with the lugs 33 on the front of the brackets 20, and are secured in place by bolts passed through the lugs 33 and 35, the spindles 27 and bearings 26 being now in a position forward of the sleeves 21.

When the bearings 26 are swung as just described, the axis of the wheels and the main frame are brought closer together, the spindles 25 being always vertical and parallel with the pins 27 and consequently always have the same angular relation with the frame. The wheels 22 maintain their position in relation to the line of draft, in substantial parallelism therewith, during the swinging of the bearings 26, being controlled by the arms 31 and the rods 32 pivotally connected therewith and with either a fixed or adjustable part of the machine. With the swing of the bearings 26 the wheels 22 are moved outward and are moved inward upon the continuation of the swinging movement of the bearings 26 until the latter are secured in place as described. The arms 31 moving forwardly with the forward swing of the bearings 26, the rods 32, swinging on their pivoted inner ends, move the ends of the arms 31, to which they are connected, outwardly tending to give the wheels 22 an outward forward flare, an objectionable feature which is compensated for in the following manner; the lugs 33 and 34 are of the same depth or thickness at the bearings 26, but from these points the lugs 33 have an outward inclination, the depth or thickness at their forward ends is consequently greater, the difference in the depth at their forward ends over the depth at the bearings 26 being equal to the outward movement of the ends of the arms 31 when the latter are moved forwardly in swinging the bearings 26, so that when the latter are secured to the lugs 33 the wheels 22 are in the same substantially parallel relation with the line of draft as they were before, as clearly illustrated in Figure 4.

When it is desired to adjust the wheels to compensate for any irregularity in their relation to the line of draft due to strain or other causes, or if it is desired to give the wheels a slight gather, the rods 32 can be unhooked from their inner end connection and turned in the castings 36 which are pivotally supported on the free ends of the arms 31 and held in place by cotters or pins 38. Or the cotters or pins 38 can be removed and the castings 36 can be lifted from the arms 31 and turned upon the rods 32 until the desired adjustment is effected, the castings 36 are then replaced on the arms 31, their spindles 37 fitting in suitable openings therein, and again secured in place by the cotters or pins 38. The openings in the castings 36 through which the rods 32 extend are threaded to engage with threads on the rods 32, the threading on the latter extending a sufficient distance to permit the adjustment desired.

What we claim is—

1. In a wheeled cultivator, the combination of a frame, axles carried by vertical bearings on the frame, said bearings being pivotally supported on the frame and adapted to be swung bodily in a horizontal arc to move the axles fore and aft relative to the frame.

2. In a wheeled cultivator, the combination of a frame, vertical bearings movably supported by the frame, axles having spindles journaled in said bearings, said bearings adapted to be swung in a horizontal arc to adjust the axles bodily fore and aft relative to the frame, and means for securing the bearings to the frame.

3. In a wheeled cultivator, the combination of a frame, axles having vertical spindles journaled in bearings on the frame, said bearings being pivotally supported on the frame and adapted to be swung bodily in an arc to move the axles fore and aft relative to the frame.

4. In a wheeled cultivator, the combination of a frame, axles having substantially vertical spindles journaled in movable bearings on the frame, said bearings being pivotally supported on the frame and adapted to be swung laterally in the arc of a circle to adjust the axles bodily forward or rearward of the pivotal support of the bearings, and means to secure said bearings in either position.

5. In a wheeled cultivator, the combination of a frame, axles having vertical spindles journaled in movable bearings on the frame, said bearings adapted to be swung laterally in the arc of a circle to move said axles forward or rearward, and means to adjust the wheels angularly to the line of draft, said adjustment remaining constant irrespective of the lateral swing of said bearings.

In testimony whereof we affix our signatures, in presence of two witnesses.

GEORGE W. MIXTER.
JOHN V. HOLSTEIN.

Witnesses:
JESSIE SIMSER,
W. G. DUFFIELD.

Certificate of Correction.

It is hereby certified that in Letters Patent No. 1,440,405, granted January 2, 1923, upon the application of George W. Mixter and John V. Holstein, of Moline, Illinois, for an improvement in "Cultivators," errors appear in the printed specification requiring correction as follows: Page 1, line 100, after the word "laterally" insert the words *in the arc of a horizontal circle;* page 2, line 79, claim 3, for the word "bodily" read *laterally*, and line 80, after the word "arc" insert the words *of a circle;* and that the said Letters Patent should be read with these corrections therein that the same may conform to the record of the case in the Patent Office.

Signed and sealed this 3d day of April, A. D., 1923.

[SEAL.] KARL FENNING,
*Acting Commissioner of Patents.*